United States Patent [19]

O'Neill

[11] Patent Number: 4,511,303
[45] Date of Patent: Apr. 16, 1985

[54] SELF-LOADING AND UNLOADING VEHICLE

[76] Inventor: William B. O'Neill, P.O. Box 1144, Fort Morgan, Colo. 80701

[21] Appl. No.: 417,355

[22] Filed: Sep. 13, 1982

[51] Int. Cl.³ ............................................... B60P 3/00
[52] U.S. Cl. ...................................................... 414/458
[58] Field of Search ................ 414/458, 459; 296/50; 49/395; 292/59, 144, DIG. 39, DIG. 40, DIG. 55; 301/115, 125, 131, 132, 133; 280/694, 699, 280/718

[56] References Cited

U.S. PATENT DOCUMENTS

| | | | |
|---|---|---|---|
| 1,269,437 | 6/1918 | Hicks | 301/125 X |
| 2,333,208 | 11/1943 | Spear | 414/460 |
| 3,018,905 | 1/1962 | Thorton-Trump | 414/458 |
| 3,083,850 | 4/1963 | Owen | 414/458 |
| 3,099,205 | 7/1963 | Lovrinch | 292/144 X |
| 3,170,582 | 2/1965 | Gilbert | 414/460 |
| 3,181,717 | 5/1965 | Kumferman | 414/460 |
| 3,315,829 | 4/1967 | Cellini | 414/459 |
| 3,425,742 | 2/1969 | Rauber, Jr. | 292/144 X |
| 3,501,039 | 3/1970 | Mitsuyasu | 414/458 |
| 3,520,431 | 7/1970 | Tax | 414/460 |
| 3,557,982 | 1/1971 | Henriksson et al. | 414/459 X |
| 4,072,241 | 2/1978 | Parker et al. | 414/460 X |
| 4,143,781 | 3/1979 | Lenius et al. | 414/460 |

FOREIGN PATENT DOCUMENTS 454737  1/1928  Fed. Rep. of Germany ...... 280/699

Primary Examiner—Joseph E. Valenza
Assistant Examiner—Stuart J. Millman
Attorney, Agent, or Firm—Gregg I. Anderson

[57] ABSTRACT

A transport vehicle adapted to position a U-shaped frame so that arms of the U-shaped frame are on either side of a load supported in a raised position. A plurality of lifting cylinders are mounted along each arm of the vehicle and are connected to an inwardly directed tine which is positioned beneath the raised load. Once the vehicle is positioned so that the arms straddle the load and the tines are beneath the load, the cylinders are actuated and the tines raise the load to a travelling position. A tailgate is pivotally connected at one end to one of said arms and is closed for transport of the load to thereby provide transverse structural support at a trailing end of the vehicle. A plurality of wheels are singularly mounted in longitudinal alignment along the arms of said frame. Each of said wheels is quickly removable from the frame.

3 Claims, 10 Drawing Figures

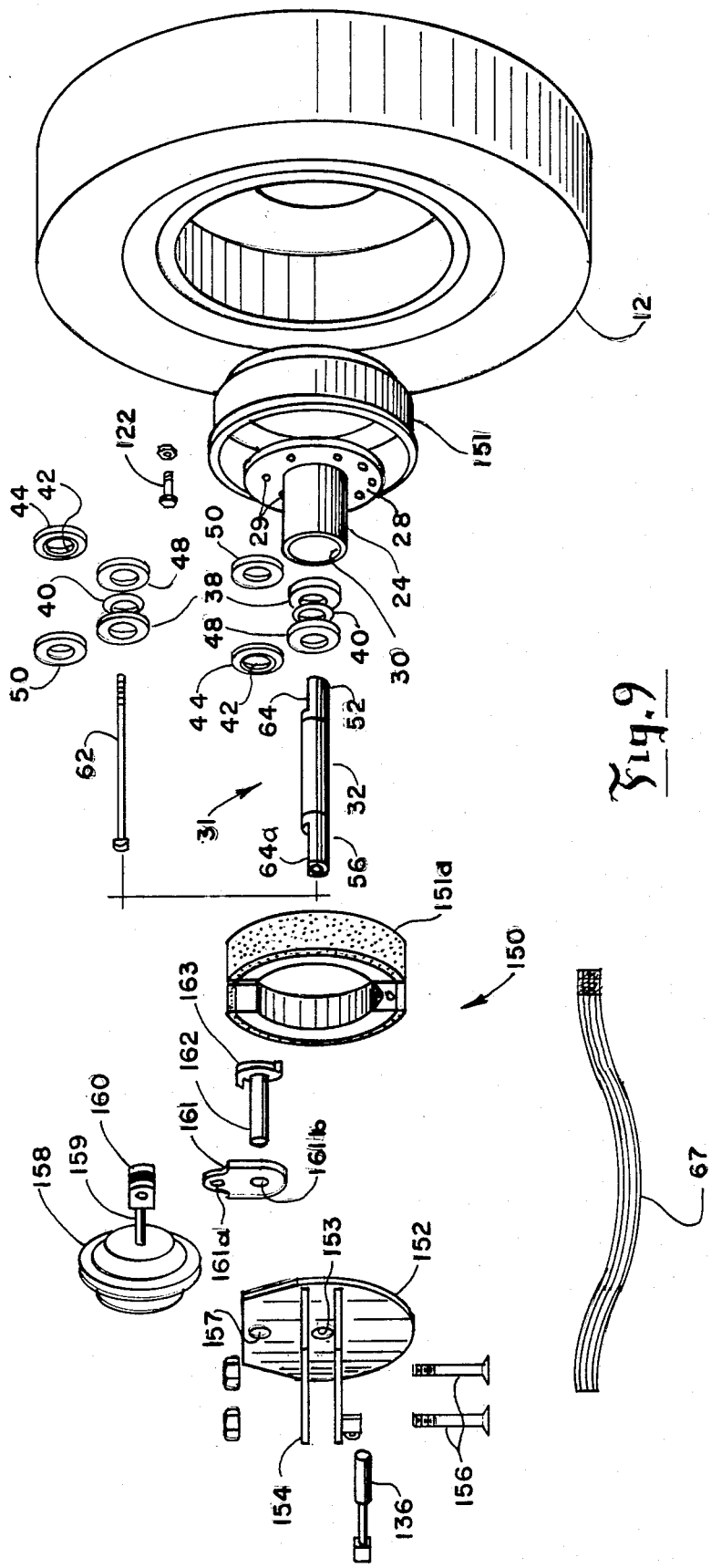

SELF-LOADING AND UNLOADING VEHICLE

BACKGROUND OF THE INVENTION

1. Field of the Invention

The present invention relates to self-loading and unloading transport-type vehicles, and more particularly to vehicles having an integrally mounted elevator or hoist for loading and unloading.

2. Brief Description of the Prior Art

The prior art shows several straddle-type vehicles adapted to move to a position above a load or article, and then pick up and transport the load within a defined area. Prior art patent references, such as Cellini (U.S. Pat. No. 3,315,829), to be discussed fully later, show a self-loading and unloading transport vehicle. The prior art discloses a transport vehicle that straddles an article, and then picks up that article from beneath the article. The prior art has long used permanent overhead or raised transverse structures relative to the load or article to provide lateral structural support. The transverse structure is positioned above the article and main longitudinal structure of the vehicle itself, and supports the article or load from that superimposed position. Movable transverse structures are known, but only from the overhead or superimposed position.

No transverse structure lies generally in the plane of the main longitudinal structure. Such an arrangement permits construction of a vehicle that can travel outside a defined area on public roads. The prior art is devoid of self-loading and unloading transport vehicles that are capable of travel over relatively large distances on government-owned and maintained highways. There are specially adapted commercially available conventional flatbed trailers that utilize hydraulic hoists or lifting mechanisms to raise a load to a position wherein the load can be placed on the flatbed. Such systems have drawbacks related generally to the fact that the hydraulic hoist or lifting mechanism is purely an add-on feature. Specific drawbacks arise because the lifting mechanism is usually of limited size and requires several lifts to load even a relatively small truck bed at a single location.

Nowhere in the prior art patents found is a true over-the-road self-loading and unloading transport vehicle found. In order to accomplish this over-the-road feature, a unique trailer frame box support structure is provided. The wheel of the present invention incorporated into the frame is relatively easily and quickly removed for tire change resulting from repair, wear or the like. In virtually all loading and unloading transport vehicles, considerable compromise must be made to the supporting wheel structure. This normally results in a cumbersome wheel mounting arrangement that is unsuited to over-the-road travel. Because the prior art is not capable of highway travel, no suspension for a self-loading and unloading trailer is shown.

Over-the-road trailer vehicles conventionally require eight tandemly-mounted wheels and tires mounted upon the rims thereof. The eight tires are, therefore, conventionally mounted in four groups of two adjacent tires. Governmental restrictions currently require that trailers not exceed a width of eight feet, which means that, if an over-the-road trailer is to maintain the legal eight foot bed width dimension, a straddle-type configuration will mean that very little room between wheels is available in which to fit a load when the wheels are spaced two abreast. Longitudinally aligning four wheels along each side of a trailer vehicle to allow for straddle-type loading and unloading and to compensate for this deficiency has not heretofore been shown in a self-loading and unloading trailer.

Straddle-type transport vehicles are seen at least as far back as U.S. Pat. No. 2,333,208 to Spear. Spear is not an over-the-road vehicle, but rather a carrier used for conveying and laying bulky drain pipes. It therefore includes a pair of longitudinally extending parallel slide rods connecting the transverse structural support members so prevalent in the prior art, which members in turn connect to and are supported by a pair of curved legs. The entire structure has a movable carriage adaptable to move along the slide rods and provide independent movement of the supported drain pipe vis-a-vis the carrier itself.

A tubular frame for releasably locking missile handling devices thereto is shown in Gilbert (U.S. Pat. No. 3,170,582). Again, a transverse structure is superimposed over the load to be handled during the pick-up and transport operations.

Transport vehicles, in many respects similar to Spear, are seen in Kumferman (U.S. Pat. No. 3,181,717; Cellini (U.S. Pat. No. 3,315,829); Tax (U.S. Pat. No. 3,520,431); Parker (U.S. Pat. No. 4,072,241); and Lenius (U.S. Pat. No. 4,143,781). All of these transport vehicles use leg members mounted to wheels to straddle a load. A transverse structure of some type superimposes the article being handled to permit movement of the vehicle over the load so that pick-up can occur. Kumferman shows the ability to handle oversized vertically-dimensioned objects by pivoting a transverse structural member connecting a pair of legs together vertically and out of the path of the article to be straddled.

Cellini does have provision for self-loading and unloading the transport vehicle. Loading is accomplished by using a pivotal post having a chain operatively connected thereto so that an operator can lift a load and slide a pallet under the load. The load can then be engaged by hydraulically operated side members. Thus, a load can be picked up whether or not it is supported on a pallet or blocks. The side members do have inwardly extending tines which support the load to be lifted. Cellini is limited, as are all other prior art references found, to the handling of a single article at one time.

Several of the straddle-like vehicles have provision for centering the load that is picked up with respect to the lifting carriage portion, as seen in Tax, or over the load-bearing wheels, as is done in Parker. Lenius also centers a straddle-type carrier by using three parallel flexible members passing through a pulley system.

OBJECTS AND SUMMARY OF THE INVENTION

The principal object of the present invention is to provide a straddle-type self-loading and unloading transport vehicle adapted to move loads over available highways.

A related object of the present invention is to provide a multiple-wheel self-loading and unloading trailer that maximizes the available area for supporting and transporting a load.

It is a further object of the present invention to provide a self-loading and unloading transport vehicle that is capable of picking up and unloading several articles in a single cycle lifting operation.

It is still a further object of the present invention to provide a self-loading and unloading transport vehicle that is easily maintained and serviced.

Still another object of the present invention is to provide a self-loading and unloading transport vehicle that includes transverse structural members that enable over-the-road hauling of loads.

In accordance with the objects of the invention, a self-loading and unloading transport vehicle in the form of a trailer adapted to be pulled by a tractor unit includes an elongated U-shaped frame having an open trailing end adapted to be selectively closed by a tailgate. The U-shaped frame connects through a gooseneck to a fifth-wheel and hence to the tractor unit.

The trailer frame is constructed of rectangular steel tubing joined into two elongated rearwardly directed arms. Interiorly positioned, with respect to each arm of the trailer frame, are four longitudinally aligned wheels rotatably and releasably mounted to the frame. Each wheel is bracketed by a box support structure of the arm on either end thereof and further is connected to a hub, which hub rotatably mounts to a spindle assembly adapted for easy disassembly and removal from the frame.

Each wheel is connected at an inner and outer end of the spindle assembly to a single leaf spring by a U-bolt and a double plate bracket, respectively, through which bolt and bracket one spring extends. The ends of each spring ride against a socket assembly. A torsion bar mounted on the frame on either side of each wheel connects to the U-bolt and plate bracket and adjusts to govern the maximum and minimum limits of vertical movement of the leaf springs and attached spindle assembly, while further aligning the wheels.

A brake air chamber is connected to the suspension and advances a piston rod to pivot a brake lever. The brake lever passes through the plate bracket to move brake shoes against a brake lining, providing braking means for the wheels.

The tailgate is pivotably connected at a trailing end of one of the rearwardly extending arms of the trailer frame. Hydraulic cylinder means are utilized to pull the tailgate closed and locked. The tailgate provides rigid transverse structure support at the rear of the trailer.

An hydraulic lifting cylinder is mounted on the box support structures along the trailer frame. The lifting cylinder is centered at the midpoint of the width of the frame arms and the wheels. A lifting plate is connected to a projectable cylinder rod of the lifting cylinder. The ends of each laterally extending lifting plate are connected to slide rods, and at the lowermost end of each slide rod is affixed a support plate extending laterally with respect to the arms. The inwardmost lateral termination of the support plate underlies and connects to a tine adapted to slide beneath a raised load.

In operation, the trailer is backed up to straddle a plurality of bulk articles, with the tines in their lowermost position. The hydraulic cylinders are activated and the tines engage the underneath surface of a rigid load or some supporting I-beam on which the load is placed, slightly above the ground. The load is then tied down to the frame and the trailer hauled away to an unloading location where the process is reversed and the load delivered.

BRIEF DESCRIPTION OF THE DRAWINGS

FIG. 9 is an exploded perspective view of the wheel assembly of the invention shown in FIG. 1.

DESCRIPTION OF THE PREFERRED EMBODIMENT

Figure 1:
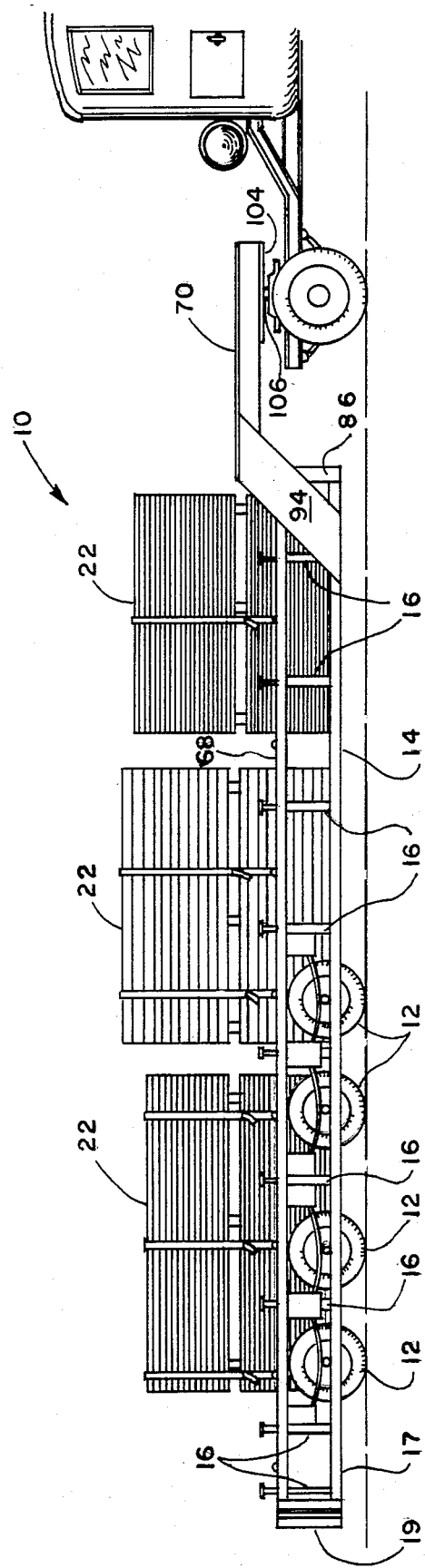
FIG. 1 is a side elevation view of a self-loading and unloading trailer of the present invention.
Figure 2:
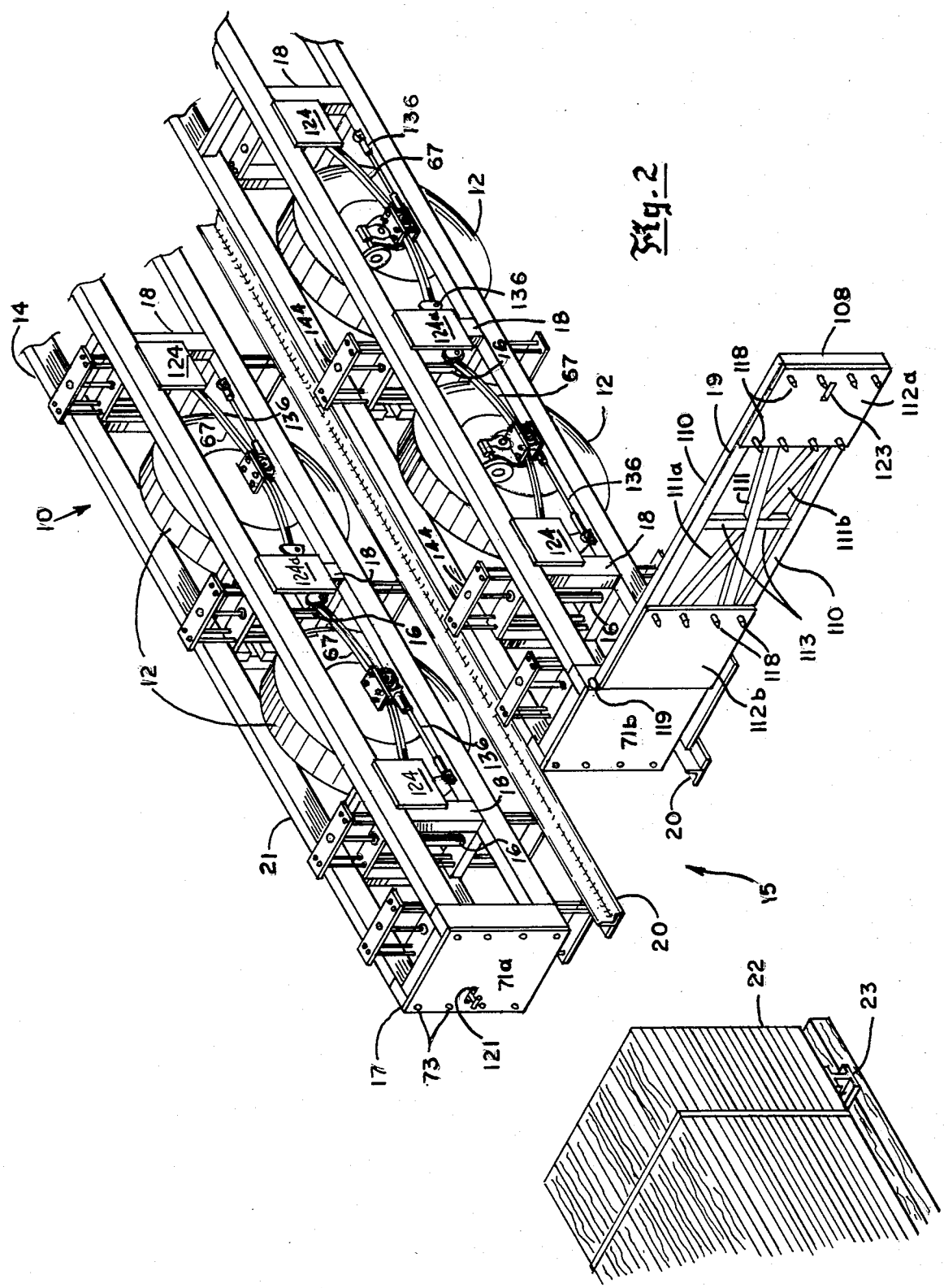
FIG. 2 is a fragmentary perspective view of the trailer frame of the invention shown in FIG. 1 in position to be backed over a supported load.

A self-loading and unloading trailer 10 is seen in FIGS. 1 and 2 to include four supporting wheels 12 rotatably mounted in longitudinal alignment along either side of an elongated U-shaped trailer frame 14 having an opening 15 defined between two rearwardly extending arms 21 at a rear or trailing end 17 of the frame. A tailgate 19 is hingeably connected at the trailing end 17 of one arm 21 of the trailer frame 14 and, when closed, acts as a transverse structural member across the opening 15 during transport of a load 22. Five hydraulically actuated lifting cylinders 16 are mounted along each arm on the trailer frame in alternating fashion on either side of the four aligned wheels 12. Another five lifting cylinders 16 are longitudinally placed equidistantly apart along the remaining length of each arm. The lifting cylinders 16 are rigidly positioned within a box support structure 18 (FIG. 3) of the frame 14. A tine 20 is operably connected to the lifting cylinder 16 and extends the length of the arms 21 of the trailer frame 14. The load 22 is supported on a raised I-beam 23 so that the opening 15 at the trailing end 17 receives the load as the trailer is backed into proper position, with the arms 21 on either side of the load 22. The tines, previously lowered, pass beneath the I-beam supporting load. Actuation of the lifting cylinders 16 through the hydraulic system (FIG. 7) raises the tines and load, which load can then be secured to the trailer frame 14 for over-the-road hauling to a second location by a tractor 13.

The wheels 12 are mounted on the trailer frame 14 in a longitudinal enclosure defined by a pair of rectangular box support structures 18 (FIGS. 2 and 3), to be described in detail later. The wheels 12 are uniquely constructed so that they are removable from the frame 14. The wheels 12 are removed for tire changes by lifting them out of the enclosure defined by the box support structures 18.

Each wheel 12 is therefore bolted in a conventional manner to a hub 24 (FIGS. 6 and 9) having an overall lateral dimension less than the width of an enclosure in the arm 21 provided for the wheel 12. The hub 24 includes a hollow cylindrical portion 26 and a radially outwardly directed flange portion 28, the flange portion having holes 29 formed at equal arcuate locations around the surface thereof. The cylindrical portion 26 has a bore 30 therethrough adapted to rotatably receive a spindle assembly 31.

The spindle assembly 31 includes an intermediate spindle 32, an inner spindle 52 and an outer spindle 56. The generally cylindrically-shaped intermediate spindle 32 fits within the bore 30 of the hub 24 and has a length substantially equal to that of the cylindrical portion 26. The hub 24 is rotatable with respect to the intermediate spindle 32. The intermediate spindle 32 includes a longitudinal bore 34 therethrough, which bore 34 intersects counterbores 36a and 36b at either end of the intermediate spindle 32. Both ends of the intermediate spindle 32 are externally threaded to threadably receive a locking nut 38 and locking washer 40, which nut and washer hold a bearing 42 and bearing race 44 against a bushing 46 mounted against an inner shoulder 45 of the intermediate spindle. The hub 24 is rotated on the bearing 42 and bearing race 44. A second locking nut 48 holds the washer 40 against the first locking nut 38. A circumferential seal 50 radially surrounds the locking nuts 38 and 48, and the washer 40, sealingly contacting the inner surface of the bore 30 of the hub 24. Lubricant is thus retained between the intermediate spindle 32 and the hub 24.

The generally elongated cylindrically-shaped inner spindle 52 is connected to the trailer frame 14 at a position adjacent to the opening 15 between the arms 21 in a manner to be described shortly. An outer end of the inner spindle 52 has a reduced diameter projection 54a adapted to be matingly received in counterbore 36a of the intermediate spindle 32. The inner spindle 52 has a bore 54 longitudinally therethrough that communicates with the bore 34 of the intermediate spindle 32 when joined thereto. The innermost end of the bore 54 of the inner spindle 52 is internally threaded, for a reason to be seen shortly. Near the innermost end of the inner spindle, a land portion 64 is formed for use in connecting the spindle assembly 31 to the trailer frame 14.

The outer spindle 56 is of generally elongated cylindrical shape and has a bore 58 along the length thereof communicating with the bore 34 of the intermediate spindle 32. The outer spindle is connected to the trailer frame 14 in a similar manner to the connection made between the inner spindle 52 and the trailer frame, except that the connection is made to the outer side of each arm 21. The innermost end of the outer spindle 56 has a projection 60 adapted to fit within the counterbore 36b of the intermediate spindle 32, while the outermost end of the bore 58 of the outer spindle communicates with an enlarged recess 72 against which the head of an elongated bolt 62 is seated. The bolt 62 threadably connects to the inner spindle 52 by means of the internal threading on the inner spindle. Once the bolt is tightened, the entire spindle assembly 31 is joined together, the hub 24 being rotatably mounted thereon. The outermost end of the outer spindle 56 has a land portion 64a, which portion 64a is adapted to permit connection to the trailer frame 14.

The spindle assembly 31 is joined together after the wheel 12 has been bolted to the flange portion 28 of the hub 24. The subsequent connection of the inner and outer spindles 52 and 56, respectively, completes the wheel assembly, which is then connected to the frame 14 through a U-bolt 66, a bracket 152, leaf springs 67 and torsion bars 136, as will be hereinafter described.

A brake system 150 (FIGS. 6 and 9) is incorporated with the spindle assembly 31 and the wheel 12. The brake system 150 is essentially a modified drum system. A brake drum 151 is bolted to the flange 28 of the hub 24 and to the wheel 12 by bolts 122. Brake shoes 151a are mounted between the cylindrical portion of the hub 24 and the drum 151. The double plate bracket 152 slides over the outer spindle 56 through a hole 153 formed therein. Two outwardly directed plates 154 of the bracket 152 overly and underly the spindle 56, the land portion 64a of the spindle receiving the leaf spring 67 and being held in position with respect to the bracket 152 by a pair of bolts and nuts 156, the bolts passing through holes (not shown) in the plates 154.

A brake chamber 158 of the brake system 150 is of conventional manufacture and is mounted rigidly to the spring 67 by bracket 152. A brake rod 159 extends therefrom and connects to a yoke 160 pivotally connected to a lever arm 161 through the hole 161a. The lever arm 161 is rigidly connected to a link 162, as by shrink fit, through hole 161b. The link passes through hole 157 in bracket 152 to integrally connect to a cam 163, which cam is positioned between the hub 24 and the brake shoes 151a. Actuation of the brake chamber 158, through air lines (not shown), moves lever 161, which in turn rotates the cam 163 to engage the brake shoes 151a and push the brake shoes against the brake drum 151.

Figure 5:
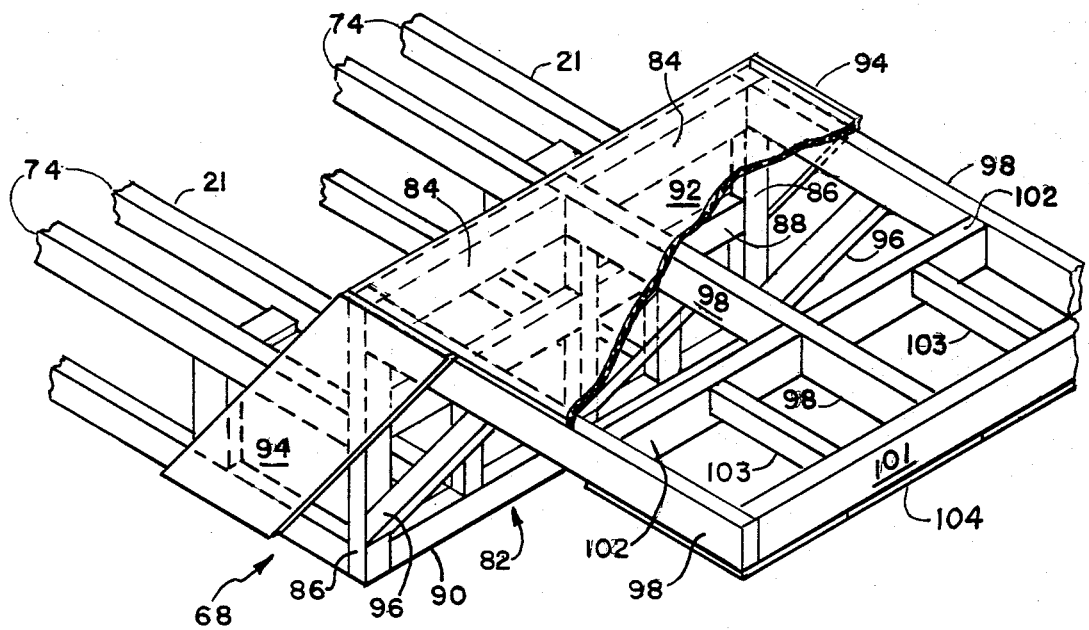
FIG. 5 is a fragmentary perspective view of a tongue of the trailer, certain structural members being shown in dotted line, of the invention shown in FIG. 1.

The trailer frame 14 (FIGS. 1, 2 and 5) includes a main body 68, to which the wheels 12 are mounted, and a tongue or gooseneck 70 connected thereto, which gooseneck is releasably connected to the tractor 13 in a conventional manner. The main body 68 includes the arms 21, which extend parallel from the gooseneck 70 to the trailing end 17. The trailing end of each arm 21 has connected thereto a cap plate 71a and 71b, having respectively two and one vertical columns of five holes 73 per column formed therein. The respective arms are selectively connected to each other end by the tailgate 19 and cap plates 71a and 71b, in a manner to be discussed hereinafter.

Each arm 21 is structurally supported by the box support structure 18 (FIG. 3) at selected locations along the length of the arm 21. The box support structure 18 includes four longitudinally extending main stringers 74 defining the length of the arms 21, which stringers are interconnected at the selected locations and held in a rectangular configuration, when viewed as a section transverse to the length of the arms, by two main vertical members 76, a bottom load-bearing tie 78 and a top tie 80. The box support structure 18 is repeated at eight equally spaced locations along the length of the trailer 10, five of the locations bracketing the four wheels 12 into an enclosure defined at either side by the main stringers 74 and at either end by one of the box support structures 18. A single bottom load-bearing tie 78 is positioned across the front of the trailer, near the gooseneck 70, and across the rear of the trailer near the tailgate 19, to support the lifting cylinders 16 at those particular locations. Each load-bearing tie 78, including those forming the transverse section of the box support structure 18, supports a lifting cylinder 16 in a manner to be discussed hereinafter.

The stringers 74 are each constructed from six inch by four inch by one-fourth inch by forty feet lengths of rectangular tubing. The bottom load-bearing ties 78 are formed from six inch by four inch by one-half inch by one foot one inch rectangular tubing, while the top ties 80 are formed from five inch by three inch by one-fourth inch by one foot one inch rectangular tubing. The main vertical members 76 are formed from six inch by four inch by one-fourth inch by one foot six inch rectangular tubing.

Each arm 21 is connected at the forward end to either side of a front cross piece 82 (FIG. 5) of the gooseneck or tongue 70. The front cross piece 82 includes two laterally extending top spreaders 84 interconnecting three vertical transition members 86 equally spaced across the width of the cross piece, which width corresponds generally to the trailer width. The top spreaders lie along an axis transverse to the length of the trailer and are three foot, five and one-fourth inches long, constructed of five inch by three inch by one-fourth inch rectangular tubing. The vertical transition members 86 are each of four foot lengths of six inch by four inch by one-fourth inch rectangular tubing.

The cross piece is joined to the top four main stringers 74 of both arms 21 by two additional laterally extending spreaders 88 of three foot, five and one-fourth inch lengths, but made of six inch by four inch by one-fourth inch rectangular tubing. These additional spreaders 88 also connect at either end to one of the vertical transition members 86.

The bottom four longitudinal stringers 74 of both arms 21 connect to a bottom laterally extending spreader 90 of seven foot, two and one-half inch length made of six inch by four inch by one-fourth inch rectangular tubing, which bottom spreader 90 also connects to the bottommost end of each of the vertical transition members 86. In this manner, the cross piece 82 includes both vertical and laterally extending structure for connection to the main body 68, as well as structure for load-bearing support and resistance to torques applied at the connection between the cross piece 82 and the main body 68.

A forwardly extending platform 92 is connected to the top of the cross piece 82 by welding to the top spreaders 84. The platform is joined to the main body 68 and cross piece 82 by a parallelogram-shaped gusset plate 94 connected to the outside of each arm 21, the outside of the two outer vertical transition members 86 of the cross piece 82, and finally to the platform 92. Three tubular braces 96 extend at a forty-five degree angle from each vertical transition member 86 to connect to three forwardly projecting rails 98 of the platform 92. The rails are formed of nine foot, two inch lengths of ten inch by four inch by one-fourth inch rectangular tubing. The forward end of the platform 92 is defined by a cross member 100 of seven foot, two and one-half inch length formed from ten inch by four inch by one-fourth inch rectangular tubing, which cross member interconnects the forward ends of the rails 98. Two relatively shorter spreaders 102 of three foot, five and one-fourth inch length formed of ten inch by four inch by one-fourth inch rectangular tubing connect to and hold the middle rail 98a stationary with respect to the outer rails 98. Two pin plate supports 103 of three foot, four inch length formed from five inch by three inch by one-fourth inch rectangular tubing longitudinally extend between and connect the spreaders 102 and the forward cross piece 100 to provide a position wherein a pin plate 104 and integral pin 106 are supported for connection to the fifth wheel of the tractor (not shown).

Figure 8:
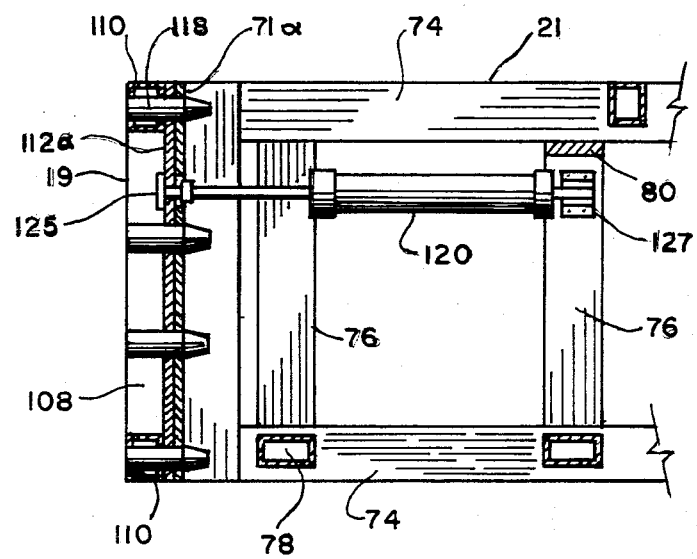
FIG. 8 is a fragmentary sectional view of a tailgate of the invention shown in FIG. 1, shown in a closed position across the trailer frame.

The tailgate 19 (FIGS. 2 and 8) is formed from rectangular tubing lengths, including two vertical members 108 at either end, two horizontal members 110 at the top and bottom of the tailgate, crossing members 111, 111a and 111b diagonally intersect connecting corners of the tailgate 19 together and two auxiliary vertical members 113. A hinge 119 at one end of the tailgate 19 connects the tailgate to one of the arms 21. Each pair of vertical members 108 are joined to a closure plate 112a and 112b, respectively. Five pins 118 are joined in a vertical column to the alignment closure plate 112b. The opposite closure plate 112a has two vertically aligned columns of pins 118.

The pins 118 are seen to be generally cylindrically-shaped terminating in a frusto-conical portion. As the closure plate 112a is abutted against the plate 71a, the frusto-conical portion allows some play so that the pins 118 swing in an arcuate path into the holes 73 of the plates 71a and 71b. An hydraulic closing cylinder 120 pivotally mounted on the arm 21 at 127 (FIG. 8) onto a vertical member 76 opposite the arm adjacent to the hinge 119 is selectively connectable, through a hole 121 in the cap plate 71a, to a slot 123 on the end of the tailgate 19 by a key 125 on the end of the cylinder piston. The hydraulic cylinder 120 applies sufficient force to close the tailgate 19, forcing the pins 118 into the closing holes 73. Once closed, the gate is held in a closed position by the closing cylinder 120. The tailgate 19 and front cross piece 82 therefore form the only transverse support structure for the trailer frame 14, the balance of the space between the arms 21 defined by the opening 15 is reserved for the load 22.

Figure 10:
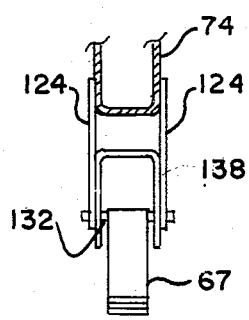
FIG. 10 is a sectional view taken in the plane of line 10—10 of FIG. 4.
Figure 4:
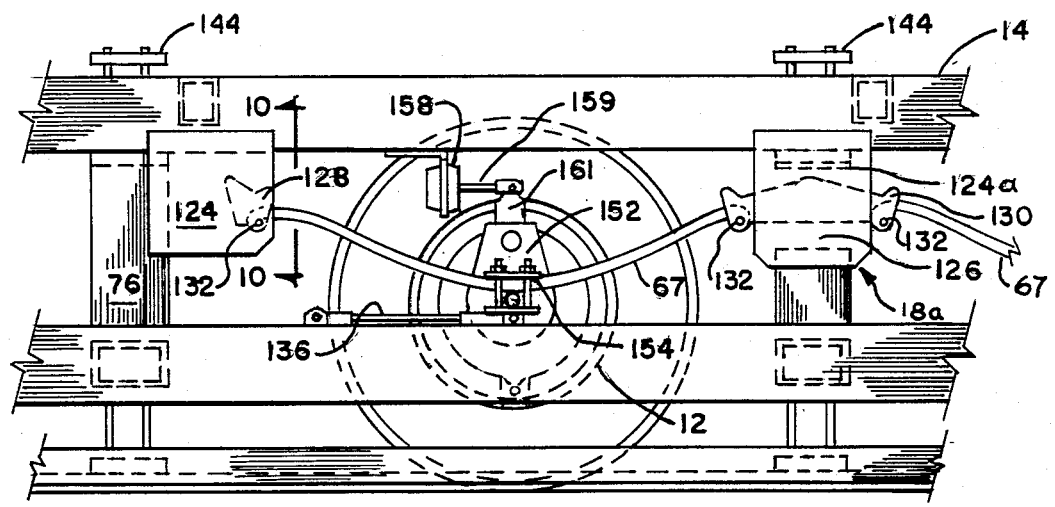
FIG. 4 is a fragmentary elevation view of the trailer frame and supporting wheels of the invention shown in FIG. 1.
Figure 6:
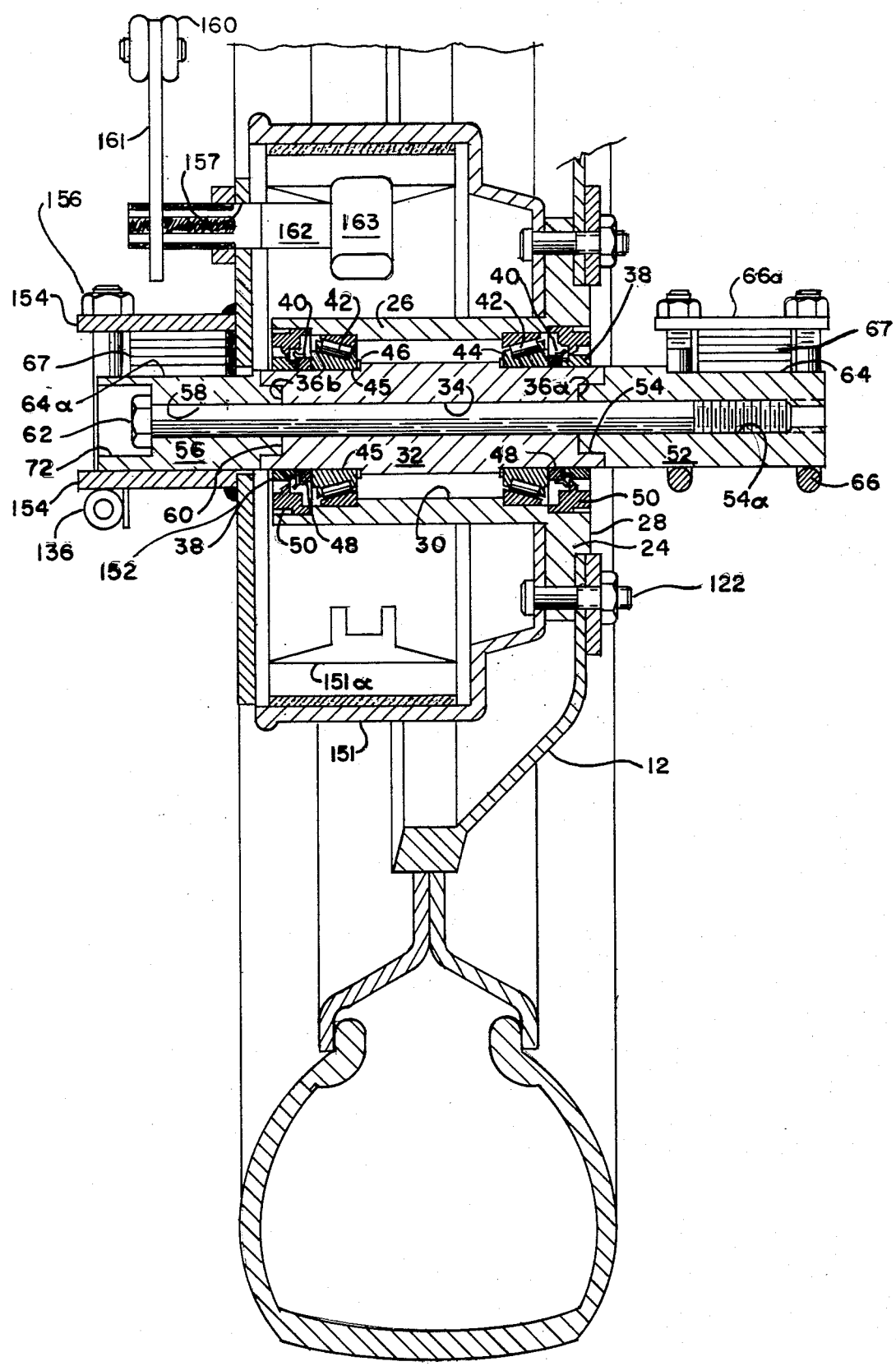
FIG. 6 is an enlarged fragmentary sectional view of a wheel assembly of the invention shown in FIG. 1.

The suspension and the manner in which the wheels 12 are mounted to the frame 14 will now be described (FIGS. 2, 4 and 6). The wheels 12 are connected to the hub 24 by the bolts 122 which pass through holes in the flange portion 28 and are secured with nuts threadably tightened onto the bolts. The spindle assembly 31 is secured at the innermost end by the U-bolts 66 and plate 66a and at the outermost end by bracket 152 and bolts 156, which bolts are tightened to secure the leaf springs 67 between the land portions 64 and 64a and the plates 154 and 66a, respectively. There is a leaf spring on either side of the wheel 12 connected, as was discussed, to the inner and outer spindles 52 and 56. The leaf springs run longitudinally within the plane defined by the longitudinal stringers 74 (FIG. 10), lying between an upper and lower longitudinal stringer 74.

The wheels 12 are mounted in two pairs of two on each arm 21 of the frame 14. Corner brace plates 124 are secured to the longitudinal stringers 74 and vertical members 76 on either side of an arm 21 and at either end of a pair of wheels 12. The brace plates 124a replace a length of the vertical member at that location, leaving a space 126 of sufficient width to mount the ends of the leaf spring 67 at that location.

One half of a leaf spring socket assembly 128, of inverted "U" transverse cross section (FIG. 10), is fixedly mounted to each brace plate 124 and provides a bearing or riding surface for one end of the leaf spring 67. The other end of a given leaf spring pair, on the outer or inner side of the trailer frame 14, is seated against a leaf spring socket assembly 130, which socket assembly is rigidly connected to the brace plate 124a. The elongated socket assembly is identical to the socket assembly 128, and is elongated to provide a surface for the next adjacent leaf spring end, that is, the socket assembly 130 receives the ends of two leaf springs, rather than one. Each socket assembly 128 has a single cross bar 132 to catch the hooked end of a leaf spring 67 should one wheel 12 of a pair of wheels drop down into a hole, while socket assembly 130 has two such cross bars 132. This structure, therefore, allows for downward vertical movement of single wheels.

Each of the leaf springs 67 are adjustable as to vertical movement and longitudinal alignment by the torsion bar 136, one end of which is pivotably connected to a bottom longitudinal stringer 74 and the other end of which is pivotably connected to the inner and outer spindles 52 and 56 at the bracket 152 and U-bolt 66, respectively. The torsion bar itself is threaded at either end for receipt in the pivotal connection (not specifically shown) at both the longitudinal stringer and the inner or outer spindle. The torsion bars on either side of a given wheel 12 must be adjusted so that the rotational axis of the wheel 12 is perpendicular to the proposed path of travel.

Figure 3:
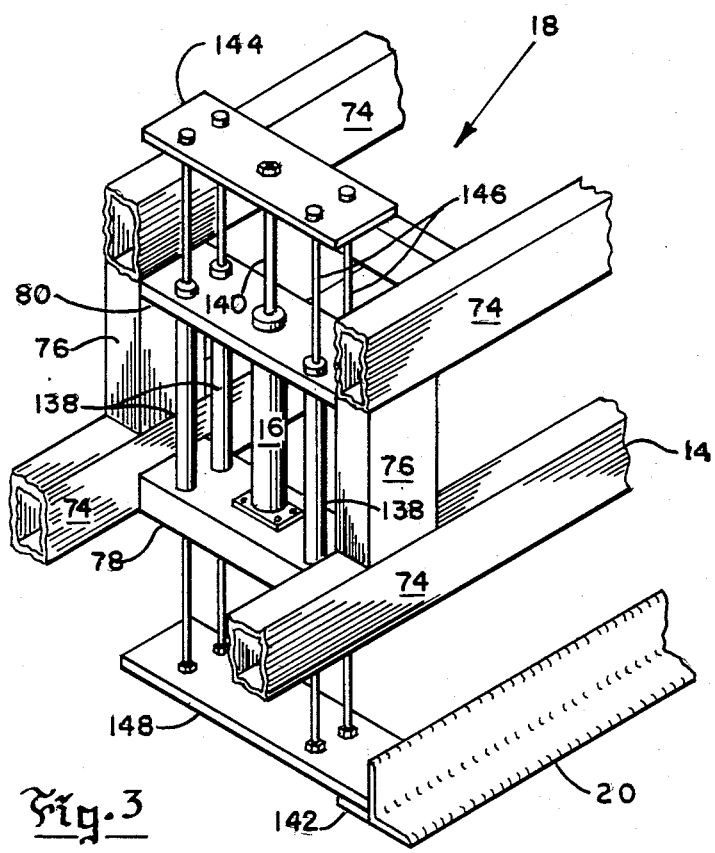
FIG. 3 is an enlarged fragmentary perspective view of the lifting mechanism of the invention shown in FIG. 1, the wheels and suspension being removed for clarity.

The lifting cylinders 16 are mounted onto the load bearing ties 78 (FIG. 3). At those locations where a lifting cylinder is associated with a box support structure 18, or a modified box support structure 18a (FIG. 4), four slide sleeves 138 are mounted parallel to the vertical members 76 on the main load-bearing ties 78. The top of the lifting cylinder 16 and the slide rods 138 are rigidly connected at the upper ends by the top tie 80, which tie 80 is connected at either end to the frame 14. Actuation of the hydraulic cylinder 16 causes a cylinder rod 140 to project upwardly therefrom through a hole in the tie 80. The end of the cylinder rod 140 is fixedly connected to a lifting plate 144, as by threaded connection. The lifting plate 144 extends laterally across the enclosure defined between the four longitudinal stringers 74 of an arm 21 and rests on the upper two longitudinal stringers 74 when the lifting cylinder 16 is all the way down. The ends of the lifting plate are secured to four lift rods 146 which extend downwardly through holes in the tie 80, through the slide sleeves 138 and load bearing tie 78 and connect to a laterally extending support plate 148. When the support plate 148 is raised by the lifting cylinder 16 to its uppermost level, the support plate is abutted against the bottom surface of the bottom two longitudinal stringers of the arms 21. An inner edge 142 of the support plate extends past the inner edge of the longitudinal stringers to connect to one of the longitudinally extending tines 20.

From the foregoing, it is seen that the lifting cylinder 16 is supported on the box structure enclosure 18 at most locations. The forwardmost and rearwardmost lifting cylinder locations are supported only by a main load-bearing tie 78 and top tie 80. At these locations, the top tie 80 and slide sleeve 138 give ridigity to the hydraulic cylinder as to lateral loads and torque moments applied thereto. The lifting plate 144, support plate 148 and slide rods 146 provide similar structural integrity during the actual lifting process. Once a lift of a load 22 is completed, the support plate 148 is abutted against the bottom two longitudinal stringers 74 which results in the trailer frame 14 being incorporated into supporting the load. The hydraulic cylinders 16 are centered at the lateral or transverse midpoints of the wheels 12 so that the box support structure described aligns the supported load 22 with the lateral centerline of the wheels 12.

Figure 7:
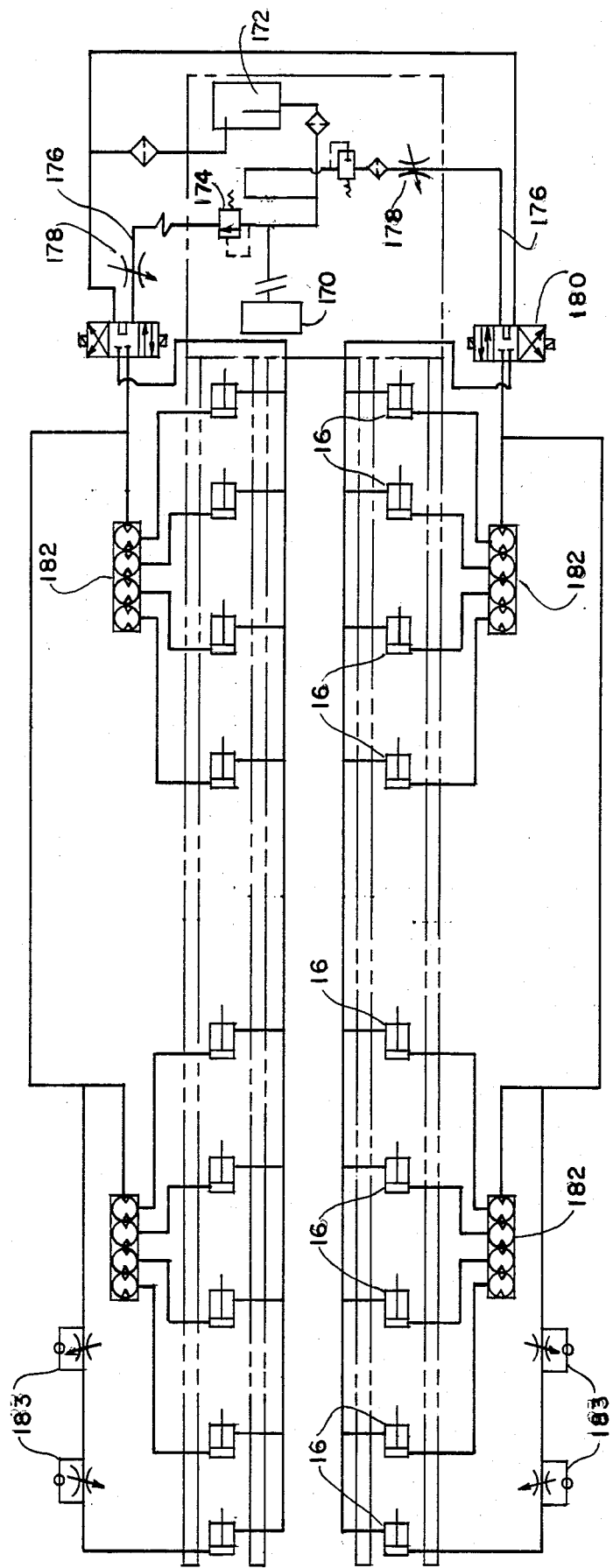
FIG. 7 is a schematic diagram of an hydraulic system of the invention shown in FIG. 1.

The hydraulic system is seen schematically in FIG. 7 to include an engine 170 and hydraulic fluid tank 172 mounted on the platform 92 of the gooseneck or tongue 70 of the trailer 10. An hydraulic pump 174 applies fluid under pressure through hydraulic lines 176 to each side of the trailer 10, the pumps also being mounted on the platform. The lines are preferably enclosed within the tubing of the trailer frame 14.

With reference to one side of the trailer 10, the operation of the hydraulic cylinder 16 being identical for the other side, the hydraulic pumps 174 supply fluid through a relief valve 178 and flow controller 180 to two series of four-way flow dividers 182, each flow divider 182 controlling pressure to four hydraulic cylinders 16. The remaining hydraulic cylindery is supplied through single flow controllers 183 so that a substantially equal pressure is supplied to each lifting cylinder 16. The four-way flow divider is a conventionally available item manufactured by Delta Power Hydraulic Company, of Rockford, Ill.

In operation, the load 22 is initially supported on the I-beams 23 which is in turn raised on a pallet or other supporting structure at a short distance above a loading pad. There can be several different loads 22 lined up for receipt by the opening 15 of the trailer 10. The hydraulic cylinders 16 are lowered to a position where the tines 20 will slide beneath the I-beams 23 of the loads 22. The trailer 10 is backed to the loads so that each arm 21 is on either side of the load and the tines are underneath the I-beams. Once the forwardmost load is adjacent to the cross piece 82, the tractor is stopped and the brake set. The engine 170 is activated and the hydraulic cylinders 16 raise the tines 20 and supported load 22 to a position where the support plate 148 is flush against the bottom of the longitudinal stringers 74. The load is then secured to the trailer frame 14 and over-the-road travel to another destination can commence. From the foregoing description, it is also seen that the brake system 150 and spindle assembly 31 can be disassembled to remove the wheels 12 from the trailer frame 14.

The wheel 12 is lifted, or dropped, from the frame between the stringers 74. As best seen in FIGS. 2 and 6, this is accomplished by removing the bolt 62, which allows movement between the spindles 32, 52 and 56. The torsion bar 136, outer leaf spring 67 and brake system 150 are disconnected from the wheel 12 to be removed for repair. Then, a spreader (not shown) is used to pull the outer spindle 56 and inner spindle 52 from the intermediate spindle 32. The entire wheel 12 can then be raised, or dropped, between the longitudinal stringers 74 and the respective box structures 18.

The present invention has been described with a certain degree of particularity. The described embodiment is to be considered in all respects only as illustrative, and not restrictive, and the scope of the invention is, therefore, indicated by the appended claims rather than the foregoing description.

What is claimed is:

1. A transport trailer releasably connected to and pulled by a tractor, said trailer adapted to automatically load and unload at least one object supported at a raised position, comprising in combination:

an elongated, generally U-shaped frame having a closed end and an open end and two elongated arms defining an opening therebetween and extending rearwardly from the closed end to the open end, each arm terminating at the closed end in a cap plate having a plurality of prealigned holes formed therein, one of said cap plates having another hole formed therein, each of said arms further including a plurality of box structures spaced at predetermined positions along the length of each arm, each box structure including two vertical members and two horizontal members defining either side of an opening in said arms;

at least one wheel rotatably connected to each of said arms for allowing movement of said frame as said frame is pulled by the tractor, each of said wheels mounted within one of said openings;

lifting means for picking up said object from said raised position and for lowering said object to a second raised position, said lifting means being mounted on selected ones of said horizontal members of said box structures and operably connected to a tine extending substantially the length of each of said arms and generally adjacent the opening defined between said arms;

transverse structure pivotably connected to one of said arms at the open end thereof, said transverse structure including at least two vertical members at either lateral end thereof and two horizontal members at a bottom and a top thereof, each end of said transverse structure at each of the vertical members further including a closure plate connected to said vertical and horizontal members for mated contact with said cap plates on closure of said transverse structure against said arms, one of said closure plates nearest the pivotable connection to said one arm further having a plurality of pins joined thereto in a vertical column, said pins being of generally cylindrical shape and terminating in a frustoconical portion adapted to be received into and project through the prealigned holes on the one like shaped cap plate at the end of the one arm, the other closure plate of said transverse structure including two vertical columns of identically shaped pins adapted to be received into and project through the prealigned holes formed in the other cap plate and a slot formed in said other closure plate; and locking and closing means for pulling said transverse structure into a closed position wherein the cap plates are face-to-face with the closure plates, the pins of the closure plates projecting into the holes of the cap plates at the ends of the arms, said locking and closure means further including a piston and cylinder pivotably connected to the end of the other arm, said piston being integrally connected to a key, which key extends through the hole in said one cap plate for receipt of the slot in the other closure plate on the transverse structure, said key being of generally T-shaped configuration for initial insertion into and then rotation with respect to said slot to thereby close and lock said transverse structure upon activation of said piston cylinder.

2. The invention as defined in claim 1 wherein said lifting means includes hydraulic cylinders mounted intermediate the top and bottom of said box structure horizontal members, a piston associated with said cylinder operably connected to a top tie extending across the width of each of said arms at the location of said box structure, said top tie operable connected to longitudinally extending lift rods slideable within sleeves operably connected between said horizontal members of said box structure, said rods further operably connected to a support plate connected to said tine.

3. The invention as defined in claim 1 wherein each of said box structures associated with each of said arms includes a plurality of single wheels connected to each of said arms adjacent theopening defined between the box structures.

* * * * *